(12) United States Patent
Totsuka

(10) Patent No.: US 9,706,083 B2
(45) Date of Patent: Jul. 11, 2017

(54) APPARATUS FOR GENERATING IMAGE DATA, METHOD, AND MEDIUM

(71) Applicant: CANON KABUSHIKI KAISHA, Tokyo (JP)

(72) Inventor: Atsushi Totsuka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/046,632

(22) Filed: Feb. 18, 2016

(65) Prior Publication Data
US 2016/0267365 A1    Sep. 15, 2016

(30) Foreign Application Priority Data
Mar. 13, 2015    (JP) ................. 2015-050881

(51) Int. Cl.
*B41J 29/38*    (2006.01)
*H04N 1/52*    (2006.01)
*G06F 3/12*    (2006.01)
*G06K 15/02*    (2006.01)

(52) U.S. Cl.
CPC ................. *H04N 1/52* (2013.01); *G06F 3/12* (2013.01); *G06K 15/1809* (2013.01)

(58) Field of Classification Search
CPC ....... B41J 11/0015; B41J 29/393; H04N 1/52; G06K 15/027; G06K 15/1823

USPC ............................................. 347/14, 19, 101
See application file for complete search history.

(56) References Cited

U.S. PATENT DOCUMENTS

2013/0100191 A1*  4/2013  Miyamoto ............. B41J 2/2114
                                                            347/14

FOREIGN PATENT DOCUMENTS

JP    2012-183707 A    9/2012

* cited by examiner

*Primary Examiner* — Jannelle M Lebron
(74) *Attorney, Agent, or Firm* — Carter, DeLuca, Farrell & Schmidt, LLP

(57) ABSTRACT

An object of the present invention is to reproduce glossiness and sense of sparkle on a printed material. The present invention is an apparatus for generating image data for reproducing material appearance of an object to be rendered on a printed material, the apparatus including: a gloss level obtaining unit configured to obtain a gloss level that evaluates glossiness of the object to be rendered; a sparkle level obtaining unit configured to obtain a sparkle level that evaluates sense of sparkle of the object to be rendered; and a deriving unit configured to derive a parameter relating to use of ink for reproduction of the material appearance by an image forming device, the image forming device receiving and printing the image data based on the obtained gloss level and sparkle level.

14 Claims, 14 Drawing Sheets

| GLOSS LEVEL | SPARKLE LEVEL | UV INK DEVICE VALUE | METALLIC INK DEVICE VALUE |
|---|---|---|---|
| XX | XX | XX | XX |
| | ⋮ | ⋮ | ⋮ |
| | XX | XX | XX |
| ⋮ | ⋮ | ⋮ | ⋮ |

FIG.12

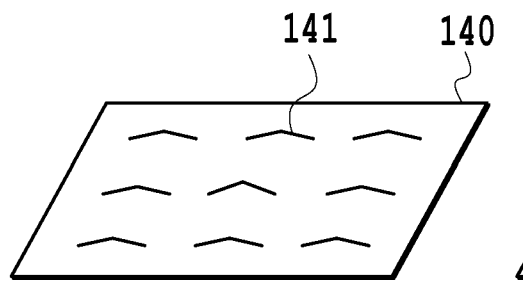 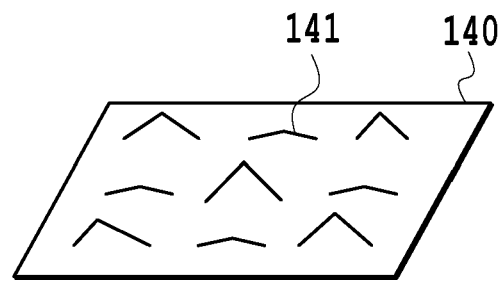
FIG.14A   FIG.14B

APPARATUS FOR GENERATING IMAGE DATA, METHOD, AND MEDIUM

BACKGROUND OF THE INVENTION

Field of the Invention

The present invention relates to a printing technique for reproducing metal texture of an object to be rendered on a printed material.

Description of the Related Art

Traditionally, in printing and outputting an image on a sheet or the like, there is known a technique for reproducing material appearance different from paper, such as a metallic glossy material appearance, by controlling a gloss level as well as color. Japanese Patent Laid-Open No. 2012-183707 discloses a technique for controlling a gloss level by forming fine concavo-convex with a photo-curable ink. For measurement of a gloss level in Japanese Patent Laid-Open No. 2012-183707, a gloss meter that can measure a specular gloss level specified in JISZ8741 is used. The specular gloss level indicates an average of radiance in a macro area of 10 mm×10 mm or larger. In Japanese Patent Laid-Open No. 2012-183707, controlling the specular gloss level allows reproduction of glossiness on a print sheet.

SUMMARY OF THE INVENTION

In a printing method disclosed in Japanese Patent Laid-Open No. 2012-183707, glossiness of an object to be rendered can be reproduced, but sense of sparkle of the object to be rendered cannot be reproduced. The term "sense of sparkle" as used herein represents a metallic material appearance different from glossiness, that is, a so-called glittering material appearance or grainy material appearance.

The present invention is an apparatus for generating image data for reproducing material appearance of an object to be rendered on a printed material, the apparatus including: a gloss level obtaining unit configured to obtain a gloss level that evaluates glossiness of the object to be rendered; a sparkle level obtaining unit configured to obtain a sparkle level that evaluates sense of sparkle of the object to be rendered; and a deriving unit configured to derive a parameter relating to use of ink for reproduction of the material appearance by an image forming device, the image forming device receiving and printing the image data based on the obtained gloss level and sparkle level.

Further features of the present invention will become apparent from the following description of exemplary embodiments (with reference to the attached drawings).

BRIEF DESCRIPTION OF THE DRAWINGS

FIG. 12 is a view showing an example of a LUT used in the present invention;

FIGS. 14A and 14B are views showing a relation between a sparkle level and a surface shape.

DESCRIPTION OF THE EMBODIMENTS

Elements of material appearance reproduced on a printed material include color, shape, glossiness, sense of sparkle, and the like. The present invention focuses particularly on glossiness and sense of sparkle, and a description will be given of a technique for reproducing glossiness and sense of sparkle on a printed material by using an image forming device such as an ink jet printer. It should be noted that a function of reproducing material appearance elements (for example, color, shape, etc.) other than glossiness and sense of sparkle may be added to the configuration of the present invention described in the following.

Figure 1A:
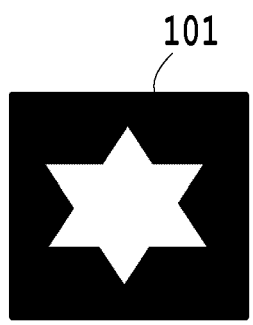
FIGS. 1A to 1C illustrate sense of sparkle.
Figure 1B:
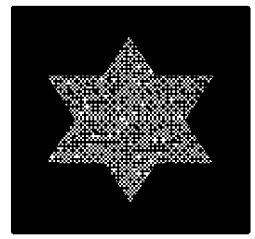
Figure 1C:
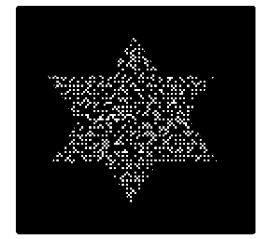

As described above, sense of sparkle indicates a property representing material appearance such as a glittering material appearance and a grainy material appearance. The sense of sparkle will be described with reference to FIGS. 1A to 1C. FIGS. 1A to 1C show images obtained by imaging a metallic object 101 under different geometry conditions. The metallic object 101 to be imaged has a high gloss level.

FIG. 1A shows an image obtained by imaging the metallic object 101 from a direction of specular reflection of light that is illuminating the metallic object 101 while imaged. In the image shown in FIG. 1A, a value for each pixel forming image data rendering the metallic object 101 represents an average luminance, that is, a specular gloss level, in a macro area (e.g., 10 mm×10 mm).

FIG. 1B shows an image obtained by imaging the metallic object 101 from a direction of specular reflection of light that is illuminating the metallic object 101 while imaged, as in FIG. 1A. It should be noted that FIG. 1B shows an image with a higher resolution as compared with the image shown in FIG. 1A. In the image shown in FIG. 1B, a value for each pixel forming image data rendering the metallic object 101 represents a luminance in a micro area (e.g., 0.1 mm×0.1 mm). In FIG. 1B, it is possible to confirm a variation in micro luminous points that are actually visually perceived.

As used herein, the term "luminous point" indicates a connection area having a luminance of a predetermined threshold or greater. For example, a luminous point is represented by an independent point in a high-luminance area when the image shown in FIG. 1B is binarized to contain a high-luminance area and a low-luminance area. The position of the luminous point depends on a variation in normal angles caused by surface concavo-convex of the metallic object 101 and a particle orientation. The position of the luminous point, therefore, changes depending on the position of a light source used when imaging, the position of an imaging device, the position of a light source used when observing an image, an observation angle, and the like. In this way, the sense of sparkle represents material appearance based on an intensity of a plurality of micro luminous points and an arrangement pattern, and greatly varies depending on geometric conditions in imaging and observing an image.

First Embodiment

In the present embodiment, a plane metallic object to be rendered is imaged under a plurality of different conditions. First, an imaging device is placed in a direction of specular reflection of light that is illuminating the metallic object while imaged. The metallic object is imaged and a first image is obtained. Further, the metallic object is imaged under different geometric conditions, and a plurality of second images (hereinafter referred to as a "second image group") are obtained. Then, based on the first image and the second image group, quantitative values (i.e., a gloss level and a sparkle level) for evaluating glossiness and sense of sparkle of the metallic object are derived. An ink jet printer performs printing according to the derived quantitative values, so as to reproduce material appearance.

(Schematic Hardware Configuration of an Image Forming System)

Figure 2:
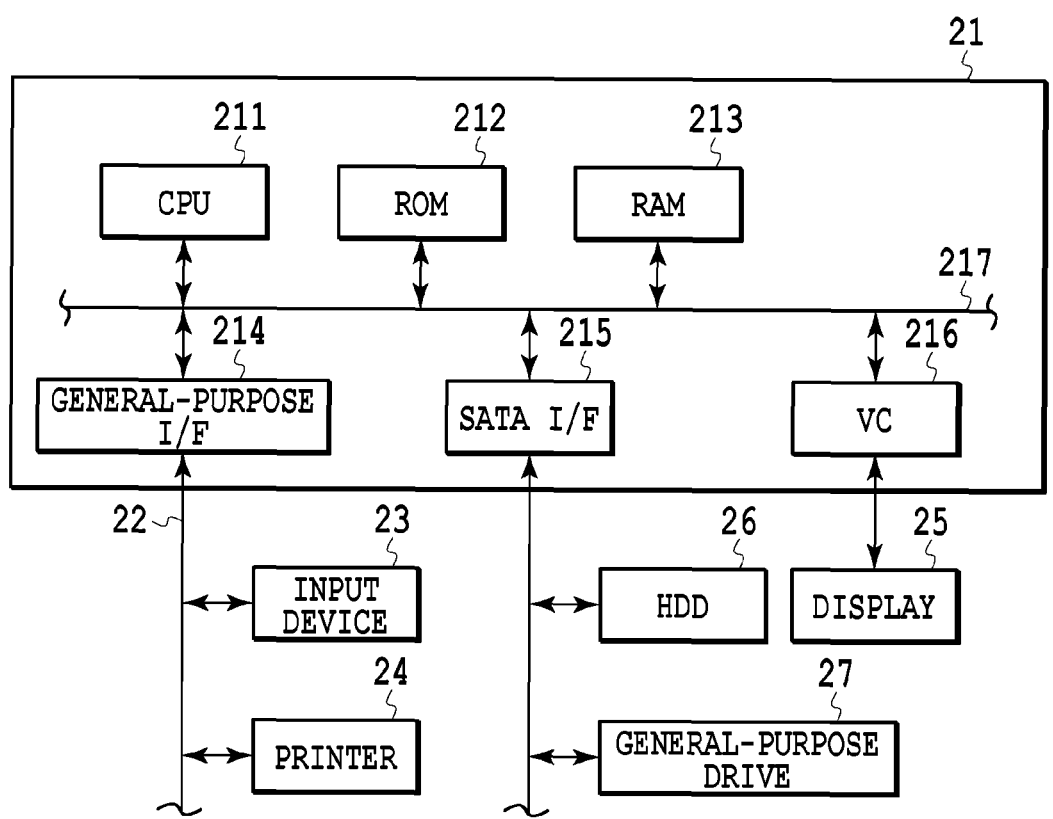
FIG. 2 is a block diagram showing an example of a schematic hardware configuration of an image forming system according to the present invention.

FIG. 2 is a block diagram showing an example of a schematic hardware configuration of an image forming system according to the present embodiment. As shown in FIG. 2, the image forming system includes an information processing device 21, an input device 23, a printer 24, a display 25, a hard disk drive (hereinafter referred to as a HDD) 26, and a general-purpose drive 27.

Examples of the information processing device include a PC. For brevity, the information processing device will be hereinafter abbreviated as PC. A PC 21 includes a CPU 211, a ROM 212, a RAM 213, a general-purpose interface (hereinafter referred to as a general-purpose I/F) 214, a serial ATA I/F (hereinafter referred to as a SATA I/F) 215, a video card (hereinafter referred to as a VC) 216, and a system bus 217.

The CPU 211 is a central processing unit for controlling operations of the entire image forming system. The CPU 211 uses the RAM 213 as a work memory, executes an operation system (hereinafter referred to as an OS) and various programs stored in the ROM 212, the HDD 26, various print media, and the like, and controls various constituent elements via the system bus 217. The programs executed by the CPU 211 include also a program for executing processing according to the present embodiment, as will be described later.

The general-purpose I/F 214 is a serial bus interface such as a USB. The PC 21 is connected to the input device 23 such as a mouse and a keyboard and the printer 24 via the general-purpose I/F 214 and the serial bus 22.

The SATA I/F 215 is connected to the general-purpose drive 27 for reading from and writing to the HDD 26 and the various print media. The CPU 211 executes reading from and writing to the HDD 26 and the various print media mounted on the general-purpose drive 27.

The VC 216 is a video interface and is connected to the display 25. The CPU 211 executes the programs stored in the ROM 212, the HDD 26, and the like to display a user interface (hereinafter referred to as a UI) on the display 25. Through the displayed UI, the user performs inputting by using the input device 23, whereas the CPU 211 receives an input by a user (hereinafter referred to as a user input) including instructions from the user.

(Functional Configuration of the Image Forming System)

Figure 3:
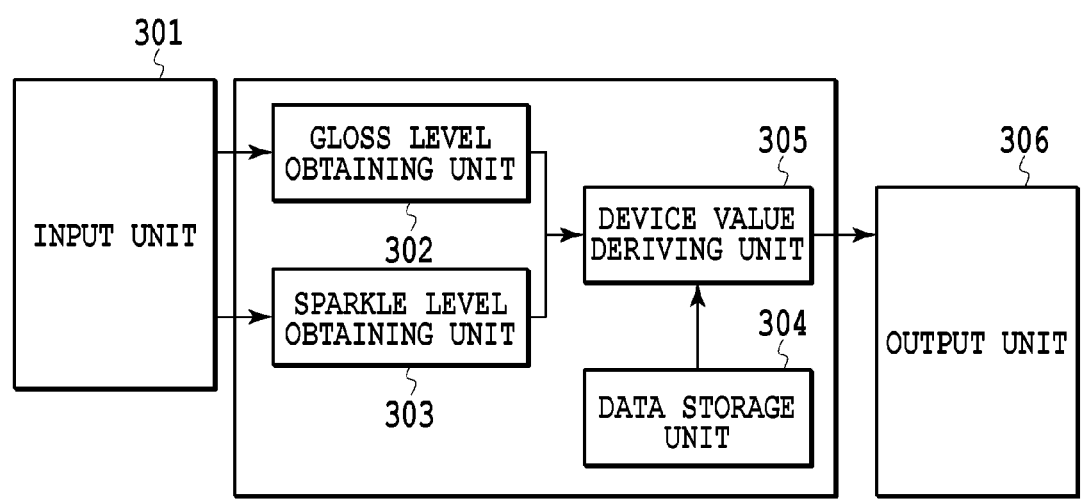
FIG. 3 is a block diagram showing an example of a functional configuration of the image forming system according to the present invention.

FIG. 3 is a block diagram showing a functional configuration of the image forming system according to the present embodiment. As shown in FIG. 3, the image forming system includes an input unit 301, a gloss level obtaining unit 302, a sparkle level obtaining unit 303, a data storage unit 304, a device value deriving unit 305, and an output unit 306.

The input unit 301 receives a user input through the UI or the like displayed on the display 25. The received user input includes a specification of the first image used for deriving a gloss level and a specification of the second image group used for deriving a sparkle level. The input unit 301 sends information on the first image specified by the user to the gloss level obtaining unit 302 and sends information on the second image group specified by the user to the sparkle level obtaining unit 303.

The gloss level obtaining unit 302 reads the first image according to the information on the first image sent from the input unit 301 to obtain image data and derives a gloss level for each pixel based on the obtained image data, so as to generate a gloss level image. Then, the gloss level obtaining unit 302 sends the generated gloss level image to the device value deriving unit 305. It should be noted that deriving a gloss level and generating a gloss level image will be described later in detail.

The sparkle level obtaining unit 303 reads the second image group according to the information on the second image group sent from the input unit 301 to obtain a plurality of pieces of image data and derives a sparkle level based on the obtained plurality of pieces of image data, so as to generate a sparkle level image. Then, the sparkle level obtaining unit 303 sends the generated sparkle level image to the device value deriving unit 305. It should be noted that deriving a sparkle level and generating a sparkle level image will be described later in detail.

The data storage unit 304 stores therein a lookup table (hereinafter referred to as a LUT) defining a relation between a gloss level and a device value of the printer 24 (for example, an ink amount) and a LUT defining a relation between a sparkle level and a device value of the printer 24. It should be noted that the data storage unit 304 may store therein a gloss level image generated by the gloss level obtaining unit 302 and a sparkle level image generated by the sparkle level obtaining unit 303.

The device value deriving unit 305 refers to the LUTs stored in the data storage unit 304 and, based on the gloss level image sent from the gloss level obtaining unit 302 and the sparkle level image sent from the sparkle level obtaining unit 303, device values of the printer 24 are derived and sent to the output unit 306.

The output unit 306 controls the printer 24 based on the device values sent from the device value deriving unit 305 and performs printing.

(Processing Performed by the Image Forming System)

Figure 4:
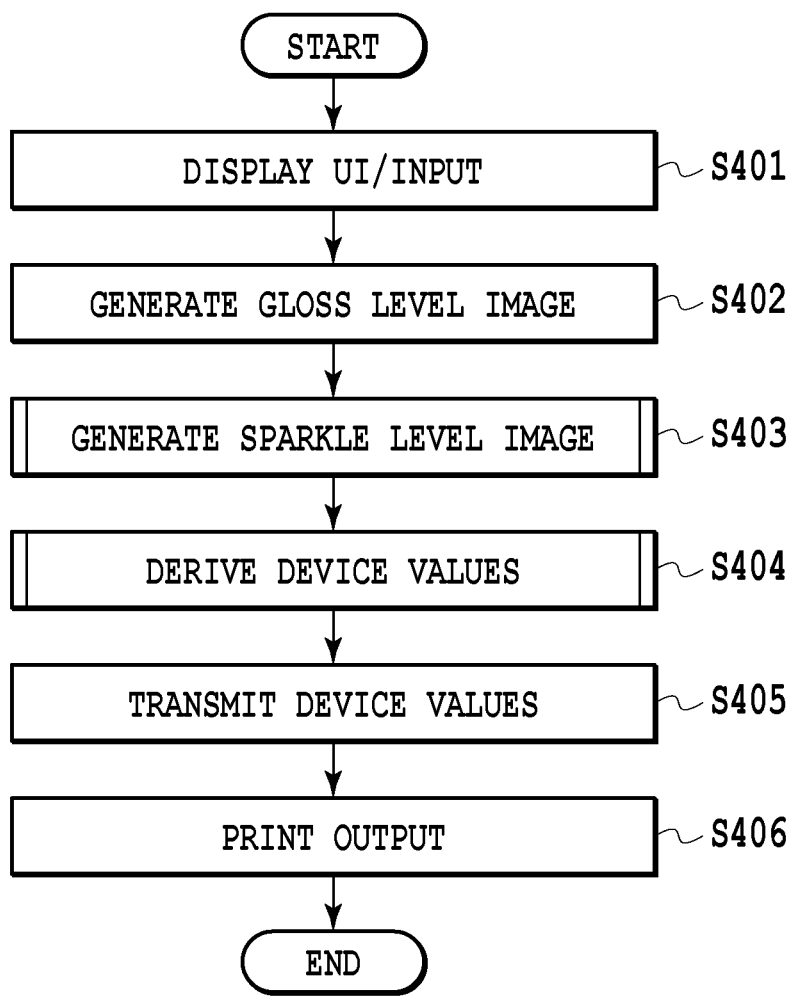
FIG. 4 is a flow chart showing a flow of processing according to a first embodiment.

FIG. 4 is a flow chart showing a flow of processing performed by the image forming system according to the present embodiment. With reference to FIG. 4, a description will be given of the processing according to the present embodiment.

First, in step S401, the input unit 301 receives information needed to perform print output according to the present embodiment. The needed information is obtained by the user performing inputting by using the input device 23 through the UI to which the user can input the information displayed on the display 25.

Figure 5:
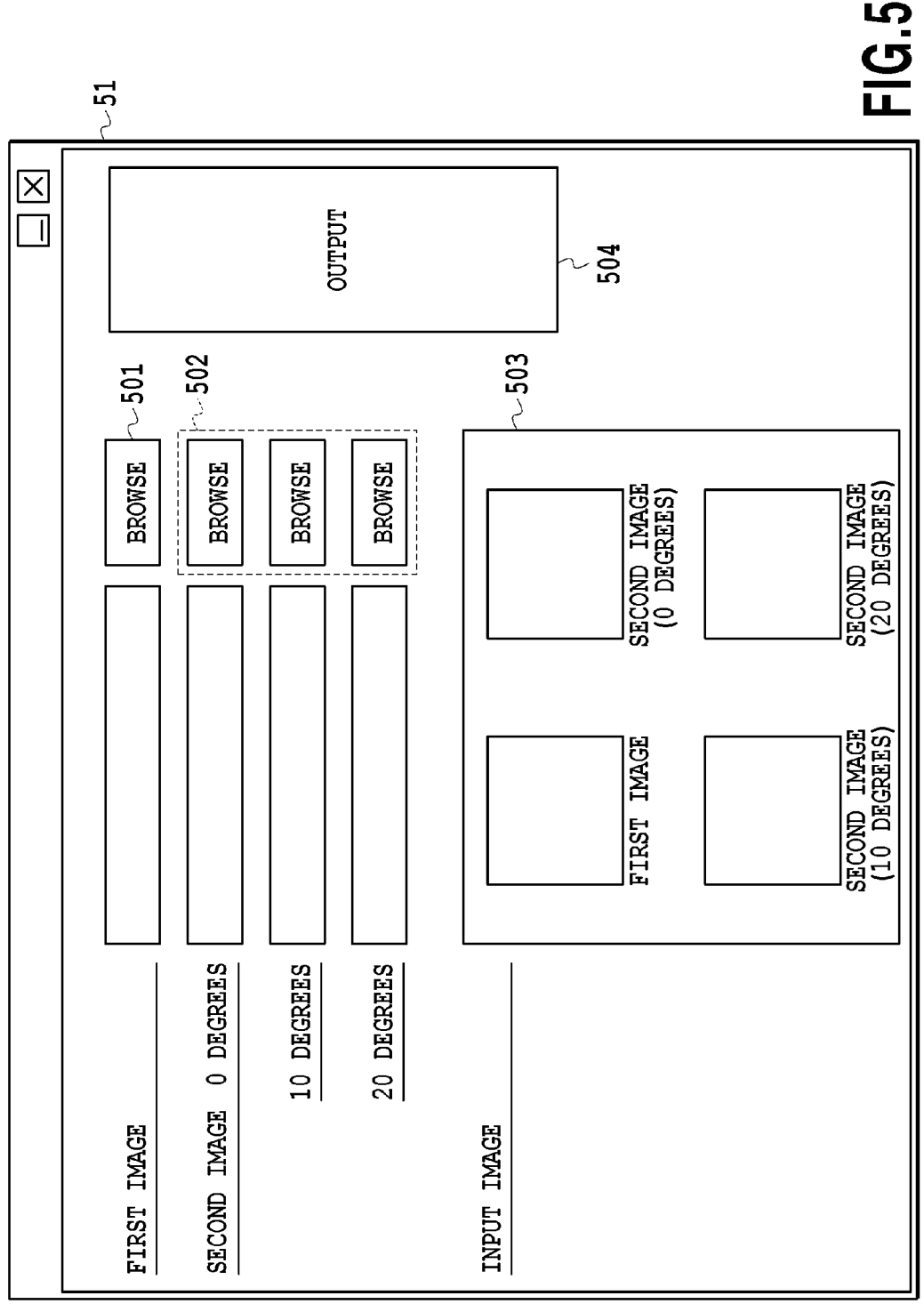
FIG. 5 is a view showing an example of a UI according to the first embodiment.

FIG. 5 shows an example of a UI to which a user can input information needed to perform print output according to the present embodiment. A UI 51 has a browse button 501 for selecting a first image, a plurality of browse buttons 502 for selecting a second image group, an input image display area 503, and an output button 504. If the user presses the browse button 501, a first image selection screen is displayed. Then, the user selects one of images displayed on the first image selection screen and specifies the selected image as the first image. The specified first image is obtained by imaging an object to be rendered (metallic object) by using an imaging device placed in a direction of specular reflection of light that is illuminating the object to be rendered while imaged, and each pixel represents image data in a bitmap format having an RGB pixel value.

Likewise, if the user presses one of the browse buttons 502, a second image selection screen is displayed. Then, the user selects one of images displayed on the second image selection screen and specifies the selected image as the second image under a geometric condition (in the example shown in FIG. 5, one of 0, 10, and 20 degrees). Examples of the specified second image include the images shown in FIGS. 1B and 1C. In the present embodiment, three images obtained by imaging the object to be rendered (metallic object) under different geometry conditions are specified as the second image group. Three geometry conditions under which the images are captured are set: when a plane vertical direction of the metallic object to be imaged is set to 0 degrees, angles of incidence of light are 0, 10 and 20 degrees. At this time, the imaging device is fixed in a direction of 0 degrees. Further, each pixel forming the second image corresponds to a micro area (e.g., 100 μm×100 μm or smaller). It should be noted that the geometry conditions when imaging and the number of second images obtained are not limited to the above examples. However, the number of second images obtained (imaged under two or more different geometry conditions) is two or more, and it is desirable that the second image group include images captured by using the imaging device placed in a direction of specular reflection of light.

The input image display area 503 is an area for displaying the first image and the second image group specified by the user. The user confirms the images displayed in the input image display area 503 and presses the output button 504. Pressing the output button 504 causes printing processing to be started, and the processing proceeds to step S402.

In step S402, the gloss level obtaining unit 302 generates a gloss level image based on the first image specified in step S401. The generated gloss level image is image data in a bitmap format having a specular gloss level (average luminance) of the metallic object corresponding to each pixel position, as a pixel value. As described above, since each pixel in the first image has an RGB value as a pixel value, in this step, the RGB value is converted into a luminance value Y by using a predetermined converting expression for each pixel forming the first image. Accordingly, a bitmap image in which each pixel has a luminance value Y as a pixel value is generated. For example, in a case where the first image is a sRGB image, using Expression (1) can convert the RGB value into the luminance value Y.

[Expression 1]

$$\begin{pmatrix} X \\ Y \\ Z \end{pmatrix} = \begin{pmatrix} 0.4124 & 0.357 & 0.1805 \\ 0.2126 & 0.7152 & 0.0722 \\ 0.0193 & 0.1192 & 0.9505 \end{pmatrix} \begin{pmatrix} R_{Linear} \\ G_{Linear} \\ B_{Linear} \end{pmatrix},$$ Expression (1)

$$\begin{pmatrix} R_{Linear} \\ G_{Linear} \\ B_{Linear} \end{pmatrix} = \begin{pmatrix} R^{2.2} \\ G^{2.2} \\ B^{2.2} \end{pmatrix}$$

It should be noted that a specular gloss level, as described above, indicates an average luminance in a macro area (e.g., 10 mm×10 mm or larger). Therefore, it is desirable that each pixel forming the first image correspond to a macro area of 10 mm×10 mm, for example. In other words, the first image is preferably a low-resolution image. However, image processing may be performed on a high-resolution image in which each pixel corresponds to a more micro area of 10 mm×10 mm or smaller, and the thus-obtained image having a lower resolution may be used as the first image. After converting the RGB value into the luminance value Y for all pixels, the gloss level obtaining unit 302 performs area determination to determine an area rendering the metallic object that requires reproduction of glossiness. One example of area determination methods is, after performing area division processing such as a divide-and-conquer approach based on the luminance value obtained in this step, selecting an area having an average of a threshold or greater in the area as the area rendering the metallic object. It should be noted that the area determination method is not limited to this.

In step S403, the sparkle level obtaining unit 303 generates a sparkle level image based on the second image group specified in step S401. The generated sparkle level image is image data in a bitmap format having a sparkle level of the metallic object corresponding to each pixel position, as a pixel value. The processing in step S403 will be described later in detail. It should be noted that in step S402, in a case where the image having a lower resolution obtained by performing image processing on a high-resolution image is used as the first image, the second image captured under a geometry condition of an angle of incidence of 0 degrees used in this step may also be used as the high-resolution image.

In step S404, the device value deriving unit 305 derives device values of the printer 24 based on the gloss level image generated in step S402 and the sparkle level image generated in step S403. The device value of the printer 24 is a parameter relating to ink usage that specifies an amount of ink ejected by the printer 24, a halftone pattern to be used for ejection, the number of ejections for the halftone pattern, and the like to reproduce material appearance such as glossiness and sense of sparkle. To derive the device values, a LUT in which a gloss level is associated with a device value and a LUT in which a sparkle level is associated with a device value are used. The processing in step S404 will be described later in detail.

In step S405, the device value deriving unit 305 transmits the device values derived in step S404 to the printer 24.

In step S406, the output unit 306 controls the printer 24 based on the device values transmitted from the device value deriving unit 305 and prints an image on a sheet.

(Details of Sparkle Level Image Generation Processing)

Figure 6:
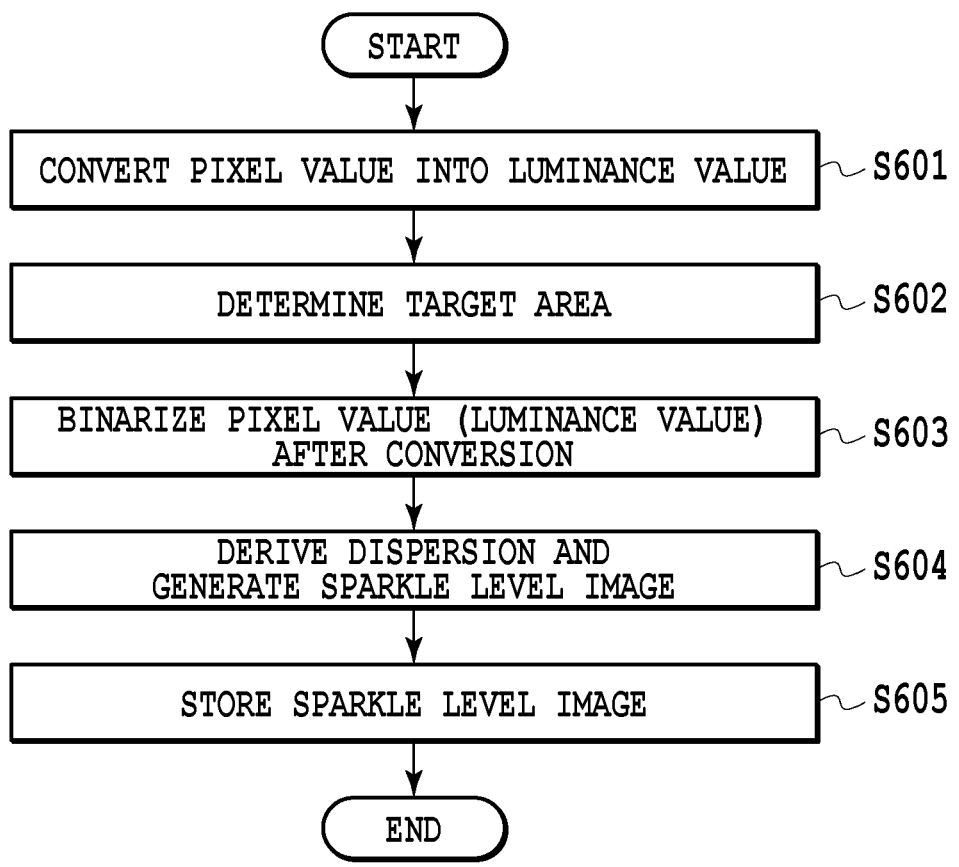
FIG. 6 is a flow chart showing a flow of sparkle level image generation processing according to the first embodiment.

FIG. 6 is a flow chart showing a flow of sparkle level image generation processing (step S403 in FIG. 4) according to the present embodiment. With reference to FIG. 6, the sparkle level image generation processing will be described.

In step S601, in each image in the second image group, the sparkle level obtaining unit 303 converts an RGB value into a luminance value Y for each pixel. Expression (1) is used for the conversion as in step S402. It should be noted that the processing in the following steps S602 and S603 is also performed on all of the second images (three images in the present embodiment) like in this step.

In step S602, the sparkle level obtaining unit 303 performs area determination to determine an area rendering the metallic object that requires reproduction of sense of sparkle. One example of area determination methods is, after performing area division processing such as a divide-and-conquer approach based on the luminance value obtained in step S601, selecting an area having an average of a threshold or greater in the area as an area rendering the metallic object. It should be noted that the area determination method is not limited to this. For example, the following method can also be used as one of the area determination methods. As described above, the sense of sparkle has a property that changes positions of a plurality of luminous points depending on a position of a light source and an observation angle, so in an area having the property, there is a remarkable difference in luminance between images depending on an angle of incidence of light when imaging. Therefore, a differential image is generated from the two second images captured under two different geometry conditions, and an area combining a pixel having a differential value of a predetermined threshold or greater with its neighboring area may be selected as an area rendering the metallic object. It should be noted that the processing in the following steps S603 and step S604 is performed on the area determined to be rendering the metallic object. As a result of area determination in this step, if there exist a plurality of separate areas determined to be rendering the metallic object, the processing in the following steps S603 and step S604 may be performed on each one of the plurality of areas.

In step S603, the sparkle level obtaining unit 303 performs binarization processing based on a threshold determination of a luminance value on the area determined to be rendering the metallic object in step S602. For the threshold, for example, an average luminance value Yave in the area may be calculated and used, or a threshold may be set by the Otsu's method which is based on the histogram. Through the binarization processing, a pixel value of a pixel having a luminance value of a predetermined threshold or greater is set to 1 and a pixel value of a pixel having a luminance value less than the predetermined threshold is set to 0. The pixel having a pixel value of 1 as a result of the binarization processing is set to a luminous point pixel corresponding to a luminous point. It should be noted that an arrangement pattern of the luminous points is expressed by a statistic (a luminous point area rate) based on the number and size of luminous points, and this is used to define a value indicating sense of sparkle (sparkle level). However, the definition is not limited to this. For example, known labeling processing may be performed on the binary image to calculate the number of luminous points per predetermined area, and the resultant may be handled as a luminous point pattern. Further, change in a luminous point pattern involving change in an angle is defined as a unique value (dispersion), but the definition is not limited to this. For example, a value representing the luminous point pattern (the above-described luminous point area rate, etc.) may be held for each of the plurality of geometry conditions, and the data group may be handled as a sparkle level.

Figure 13:
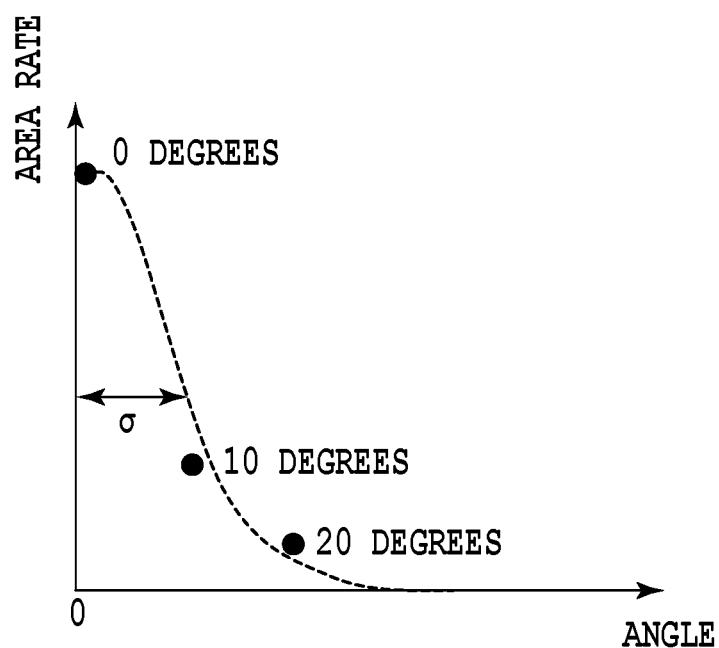
FIG. 13 illustrates a method for deriving a sparkle level.

In step S604, the sparkle level obtaining unit 303 generates a sparkle level image. More specifically, first, the total number of pixels in an area determined to be rendering the metallic object in step S602 is obtained for each image in the second image group. Next, the number of pixels determined to be luminous point pixels in step S603 is obtained for each image in the second image group, and a ratio of the number of luminous point pixels to the total number of pixels (hereinafter referred to as the luminous point area rate) is calculated. Next, as shown in FIG. 13, a horizontal axis shows an angle of incidence of light when imaging and a vertical axis shows the luminous point area rate, and three points are plotted. Finally, an approximate curve as shown by the broken line in FIG. 13 for the three plotted points is derived. The derived approximate curve is a normal distribution curve expressed by the following Expression (2):

$$\exp(-(x-\mu)\hat{\sigma}2/2\sigma\hat{}2)/(\sqrt{2\pi}\sigma\hat{}2) \quad \text{Expression (2)}$$

where μ is an average of normal angles on the surface of the metallic object. In the present embodiment, as described above, the imaging device placed at a position facing the plane metallic object is used for imaging, so a limiting condition of μ=0 is set. Further, to derive a sparkle level, an optimum parameter is searched through iteration with an objective function of a square error and a variable parameter of a dispersion. In the present embodiment, a dispersion of $\sigma\hat{}2$ is handled as a sparkle level, and a sparkle level image is generated in which each pixel in the area determined to be rendering the metallic object has a sparkle level (=$\sigma\hat{}2$) as a common pixel value.

In step S605, the sparkle level obtaining unit 303 stores the sparkle level image generated in step S604 in the data storage unit 304.

(Details of Device Values Deriving Processing)

Figure 7:
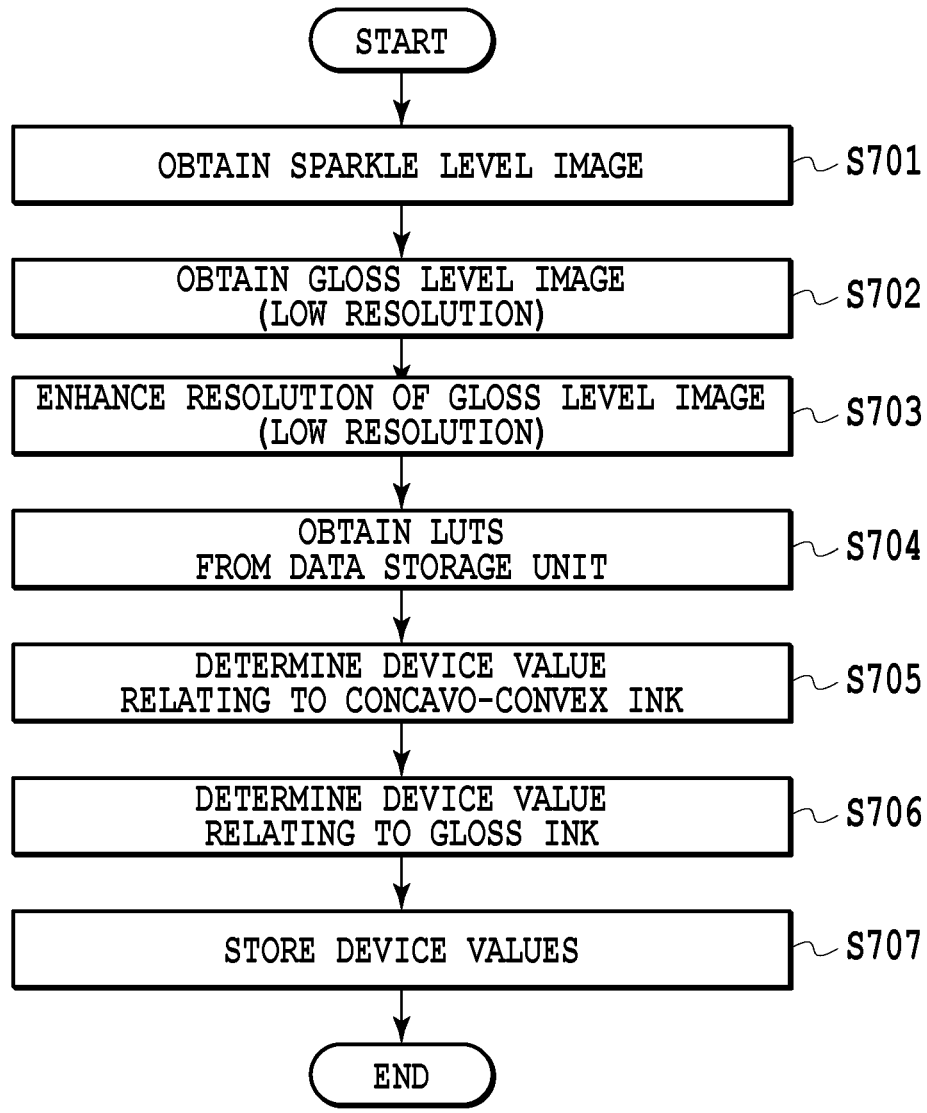
FIG. 7 is a flow chart showing a flow of device value deriving processing according to the first embodiment.

FIG. 7 is a flow chart showing a flow of device values deriving processing (step S404 in FIG. 4) according to the present embodiment. With reference to FIG. 7, the device values deriving processing will be described.

In step S701, the device value deriving unit 305 obtains the sparkle level image stored in the data storage unit 304 in step S605.

In step S702, the device value deriving unit 305 obtains the gloss level image generated in step S402.

In step S703, the device value deriving unit 305 enhances the resolution of the gloss level image obtained in step S702 and obtains a high-resolution gloss level image. The processing in step S704 following step S703 and the subsequent steps is processing for deriving a device value of the printer 24 corresponding to each of the obtained sparkle level and gloss level. This processing is performed for each pixel. However, since the sparkle level image obtained in step S701 and the gloss level image obtained in step S702 have different resolutions, the gloss level image obtained in step S702 cannot be used as it is. Accordingly, in this step, the gloss level image is converted (to enhance a resolution) so that the gloss level image and the sparkle level image have the same resolution. For resolution conversion, for example, a bilinear technique and a nearest-neighbor technique are used. As described above, for the first image and the second image group, the same target to be imaged and the same imaging device for imaging are used, so in this step, there is established a corresponding relation of pixel positions between the sparkle level image and the gloss level image.

In step S704, the device value deriving unit 305 obtains LUTs from the data storage unit 304. The LUTs are referred to to obtain device values of the printer 24 from the gloss level and the sparkle level. In the present embodiment, the gloss level is adjusted by adjusting a refractive index by using a gloss ink to reproduce glossiness, and the sparkle level is adjusted by adjusting a surface shape by using a concavo-convex ink to reproduce sense of sparkle. Further, as the gloss ink, an ink containing aluminum as a sense of sparkle material and having a higher refractive index than that of a substrate (hereinafter referred to as a metallic ink) is used. Meanwhile, the concavo-convex ink is an ink adhering to the substrate surface to form a concavo-convex shape, and the concavo-convex ink as used in the present embodiment is an ultraviolet curable ink (hereinafter referred to as a UV ink). It should be noted that the concavo-convex ink may be an ink that can form a layer having a height of 1 μm or greater, but an ink that can form a layer having a height of about 10 μm is preferable. The printer 24 can eject these two types of inks (i.e., the gloss ink and the concavo-convex ink) to reproduce glossiness and sense of sparkle.

Figure 8:
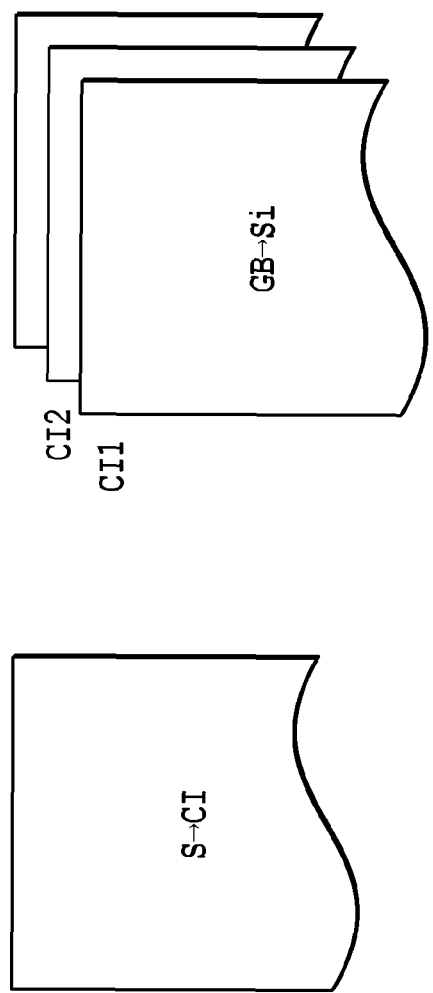
FIG. 8 is a view showing an example of LUTs according to the first embodiment.

FIG. 8 shows an example of the LUTs obtained in step S704. In the present embodiment, the data storage unit 304 stores two types of LUTs. One is a first LUT defining a corresponding relation between a sparkle level (S) and a device value (CI) relating to the concavo-convex ink. The other is a second LUT defining a corresponding relation between a gloss level (GB) for each device value (CI1, CI2, . . . ) relating to the concavo-convex ink and a device value (Si) relating to the gloss ink. The device value (CI) relating to the concavo-convex ink is given by an integer from 0 to 100 (each value corresponds to a halftone pattern) and the number of lamination indicating how many times of ejections a halftone pattern is used. A halftone pattern is predetermined with respect to each value of integers from 0 to 100. It should be noted that a table including a concavo-convex arrangement pattern may also be used. The device value (Si) relating the gloss ink represents an ejection amount of the gloss ink.

The LUT is generated such that printed materials are outputted in advance under various device value conditions to obtain the above-mentioned feature amounts and then the feature amounts are associated with the device values. It should be noted that the first LUT may also be generated such that a feature amount indicating sense of sparkle that is different from the above-mentioned feature amount (i.e., a dispersion of σ^2) is obtained, and the feature amount is associated with the device value. For example, a surface shape printed with the concavo-convex ink under each device value condition may be measured, and a feature amount based on a calculated normal angle, which is regarded as a sparkle level, may be associated with a device value. More specifically, after obtaining a frequency distribution of normal angles, a most approximate dispersion in the normal distribution in which an average of the normal angles is 0 is searched, and a value obtained by multiplying the dispersion by a gain is regarded as a sparkle level. For reference, FIGS. 14A and 14B are conceptual views respectively showing a surface shape having a low sparkle level and a surface shape having a high sparkle level. FIG. 14A is a conceptual view showing a surface shape having a low sparkle level. Since convex portions 141 formed on a substrate (flat medium) 140 are substantially regular, the dispersion of normal angels is small. FIG. 14B is a conceptual view showing a surface shape having a high sparkle level. Since convex portions 141 formed on a substrate 140 are irregular, the dispersion of normal angels is great.

Go back to the explanation of the flow chart of FIG. 7. In step S705, the device value deriving unit 305 determines a device value relating to the concavo-convex ink based on the sparkle level. As described above, the device value relating to the concavo-convex ink can be obtained by referring to the LUT in which the sparkle levels are associated with the device values relating to the concavo-convex ink. The LUT is searched for a value most approximate to the sparkle level of a target pixel in the sparkle level image obtained in step S701, and the device value corresponding to the value is determined to be the device value relating to the concavo-convex ink. It should be noted that the LUT may be searched for two or more device values approximate to the sparkle value of a target pixel in the sparkle level image obtained in step S701, and a device value relating to the concavo-convex ink may be calculated by interpolation.

In step S706, the device value deriving unit 305 determines a device value relating the gloss ink based on the gloss level. As described above, the device value relating to the gloss ink can be obtained by referring to the LUT in which the gloss levels are associated with the device values relating to the gloss ink. The LUT is searched for a value most approximate to the gloss level of a target pixel in the gloss level image obtained in step S703, and the device value corresponding to the value is determined to be the device value relating to the gloss ink. It should be noted that the LUT may be searched for two or more device values approximate to the gloss level of a target pixel in the gloss level image obtained in step S703, and a device value relating to the gloss ink may be calculated by interpolation.

In step S707, the device value deriving unit 305 generates a bitmap image in which each pixel has the device values obtained in steps S705 and S706 as pixel values, and stores the bitmap image in the data storage unit.

(Cross-Sectional Views of a Formed Image)

Figure 11A:
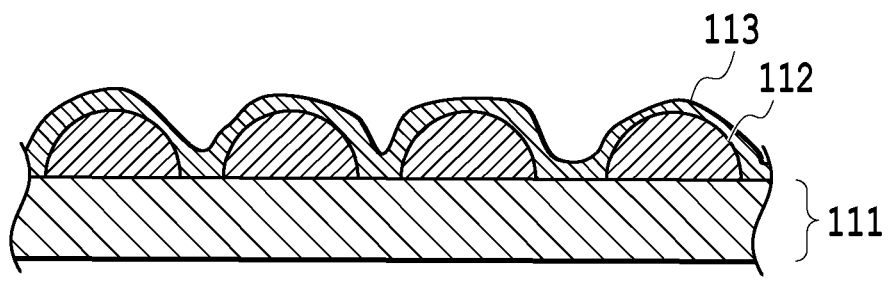
FIGS. 11A to 11C are cross-sectional views of an image formed according to the present invention.

FIG. 11A is a cross-sectional view of an image formed according to the present embodiment. As shown in FIG. 11A, a sparkle level control layer 112 formed by the concavo-convex ink (UV ink) is provided immediately on a substrate 111. Further, a gloss level control layer 113 formed by the gloss ink (metallic ink) is provided on the substrate 111 and the sparkle level control layer 112. Since the thickness of the gloss level control layer 113 is not constant depending on the amount of gloss ink to be applied, a fine concavo-convex shape may be formed by the gloss ink. The fine concavo-convex shape by the gloss ink has a smaller variation as compared with a concavo-convex shape formed by the concavo-convex ink, so the fine concavo-convex shape may be handled as an error in the concavo-convex shape formed by the concavo-convex ink.

Second Embodiment

In the first embodiment, a description has been given of a method in which the gloss level and the sparkle level are obtained from a plurality of captured images and glossiness and sense of sparkle are reproduced on a printed material to be outputted. In the present embodiment, a method different from the one of the first embodiment will be used to obtain a gloss level and a sparkle level. A description will be given of the case where a unique patch image is outputted for the purpose of generating a color sample used in a design work flow, for example. It should be noted that a description of a content common to the first embodiment and the present embodiment will be simplified or omitted, and a content different from the first embodiment will be described.

A schematic hardware configuration of an image forming system according to the present embodiment is the same as that of the first embodiment (see FIG. 2).

A functional configuration of the image forming system according to the present embodiment may also be the same as that of the first embodiment (see FIG. 3). As shown in FIG. 3, the information forming system according to the present embodiment includes an input unit 301, a gloss level obtaining unit 302, a sparkle level obtaining unit 303, a data storage unit 304, a device value deriving unit 305, and an output unit 306.

The input unit 301 receives a user input through a UI or the like displayed on a display 25. The received user input includes a gloss level and a sparkle level. The input unit 301 sends the received gloss level to the gloss level obtaining unit 302 and sends the received sparkle level to the sparkle level obtaining unit 303.

The gloss level obtaining unit 302 obtains the gloss level sent from the input unit 301 and transfers it to the device value deriving unit 305.

The sparkle level obtaining unit 303 obtains the sparkle level sent from the input unit 301 and transfers it to the device value deriving unit 305.

The device value deriving unit 305 refers to LUTs stored in the data storage unit 304 and, based on the gloss level sent from the gloss level obtaining unit 302 and the sparkle level sent from the sparkle level obtaining unit 303, device values of a printer 24 are derived.

(Processing Performed by the Image Forming System)

Figure 9:
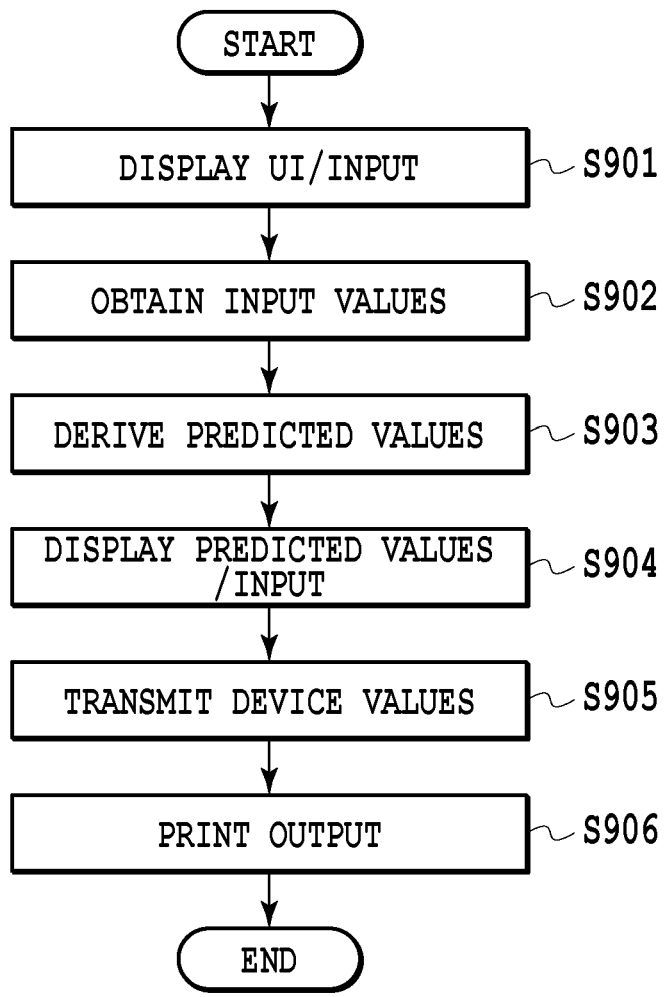
FIG. 9 is a flow chart showing a flow of processing according to a second embodiment.

FIG. 9 is a flow chart showing a flow of processing performed by the image forming system according to the present embodiment. With reference to FIG. 9, the processing according to the present embodiment will be described.

First, in step S901, the input unit 301 displays an UI to which a user can input information needed to perform processing according to the present embodiment on the display 25 and receives a user input.

Figure 10:
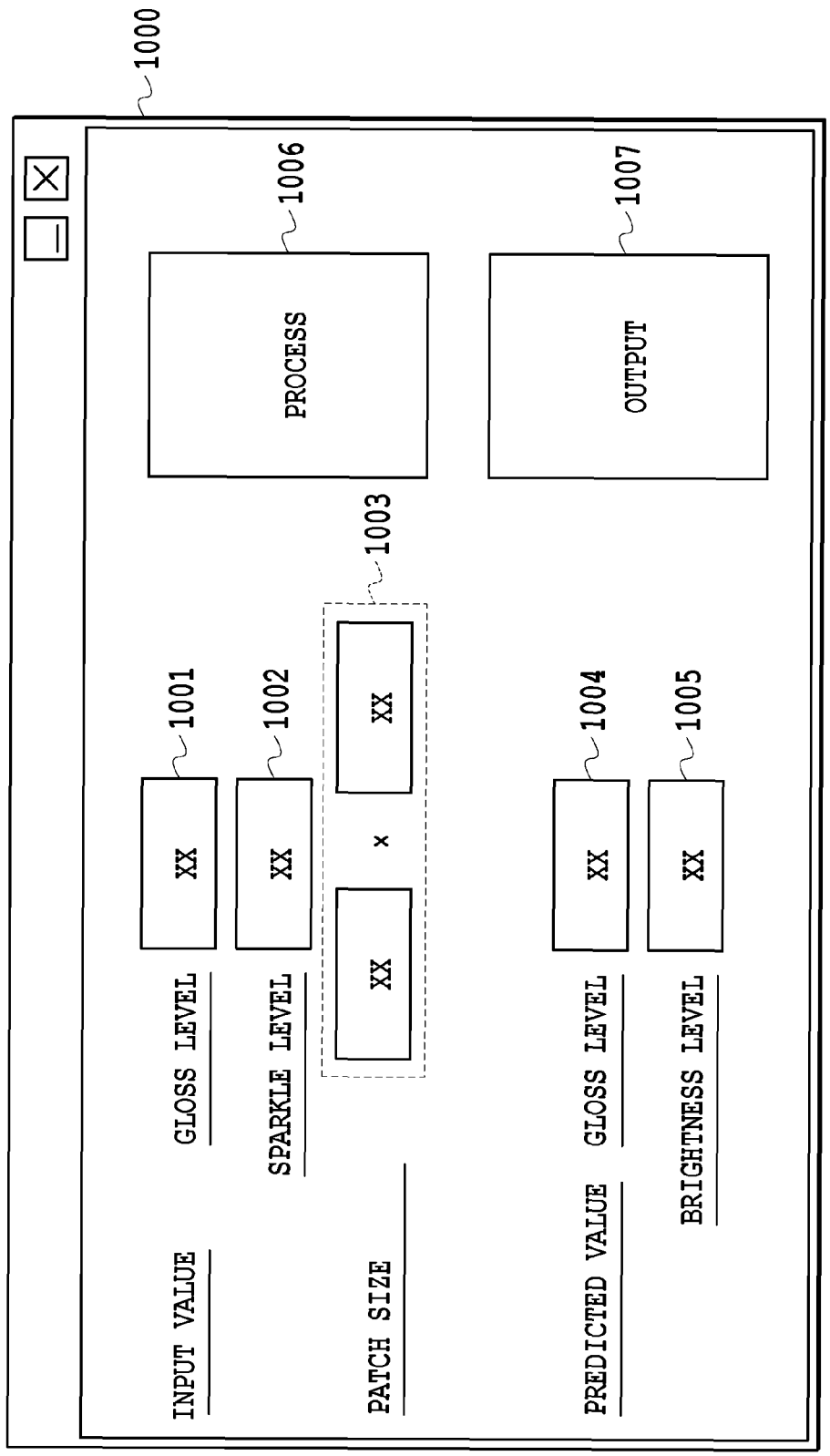
FIG. 10 is a view showing an example of a UI according to the second embodiment.

FIG. 10 shows an example of a UI to which a user can input information needed to perform processing according to the present embodiment. A UI 1000 has a gloss level input unit 1001, a sparkle level input unit 1002, a patch size input unit 1003, a gloss level (predicted value) display unit 1004, a sparkle level (predicted value) display unit 1005, a processing button 1006, and an output button 1007. The user inputs a gloss level to the gloss level input unit 1001 and inputs a sparkle level to the sparkle level input unit 1002. Further, the user inputs a size of a patch to be printed to the patch size input unit 1003. After inputting the above, if the user presses the processing button 1006, the processing proceeds to step S902. It should be noted that in the UI 1000, coordinates of printing a patch and the like as well as the patch size may be inputted, and the UI 1000 may be in a form in which the user selects and inputs values from preset values.

In step S902, the device value deriving unit 305 obtains the gloss level and the sparkle level inputted by the user.

In step S903, the device value deriving unit 305 searches a first LUT for a value most approximate to the sparkle level obtained in step S902, and obtains the value as a predicted value of the sparkle level. The device value deriving unit 305 also searches a second LUT for a value most approximate to the gloss level obtained in step S902, and obtains the value as a predicted value of the gloss level.

In step S904, the device value deriving unit 305 displays the predicted value of the gloss level derived in step S903 on the gloss level (predicted value) display unit 1004 in the UI 1000. The device value deriving unit 305 also displays the predicted value of the sparkle level derived in step S903 on the sparkle level (predicted value) display unit 1005. Then, the user confirms the displayed predicted values, and if the user presses the output button 1007, the processing proceeds to step S905. Here, after the user confirms the predicted values, the user may input again the gloss level to the gloss level input unit 1001 and input again the sparkle level to the sparkle level input unit 1002 without pressing the output button. In this case, the processing goes back to step S902.

In step S905, the device value deriving unit 305 obtains from the first LUT a device value relating to a concavo-convex ink corresponding to the predicted value of the sparkle level. The device value deriving unit 305 also obtains from the second LUT a device value relating to a gloss ink corresponding to the predicted value of the gloss level. Then, the device value deriving unit 305 transmits to the printer 24 the device value relating to the concavo-convex ink and the device value relating to the gloss ink. It should be noted that the device value deriving unit 305 also transmits to the printer 24 the patch size transmitted from the input unit 301 via the gloss level obtaining unit 302 and the sparkle level obtaining unit 303.

In step S906, the output unit 306 controls the printer 24 based on the device values transmitted from the device value deriving unit 305 and the patch size, and prints the patch on a sheet.

As described above, according to the present embodiment, it is possible to obtain a printed material in which glossiness and sense of sparkle are preferably reproduced based on the gloss level and the sparkle level directly inputted by the user. It is also possible to confirm reproduction accuracy and adjust input values before printing by displaying a predicted value of a gloss level and a predicted value of a sparkle level based on reproducibility of the printer.

Other Embodiments

Figure 11B:
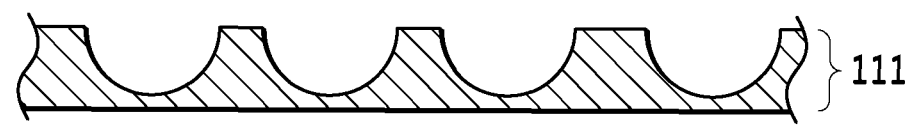
Figure 11C:
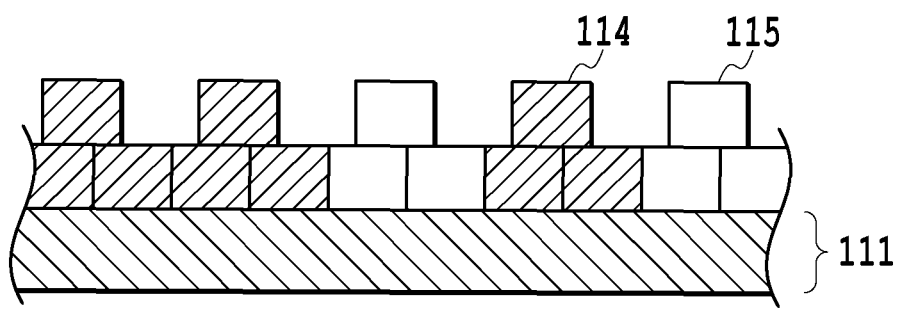

In the above first embodiment, a convex portion is formed on the substrate by using the UV ink. However, the technique of forming the concavo-convex shape may be a technique of ejecting, as an ink, a solvent that can dissolve a substrate such as vinyl chloride resin and generating a concave portion by dissolving the substrate 111 as shown in FIG. 11B. Alternatively, as shown in FIG. 11C, a laminate structure combining two types of inks 114 and 115 having different refractive indexes may be formed, and without dividing the control of concave and convex portions and refractive indexes for each type of ink, the concave and convex portions and refractive indexes may be controlled by combining both types of inks.

In the above-described first embodiment, the first LUT defining a corresponding relation between the sparkle level and the device value relating to the concavo-convex ink and the second LUT defining a corresponding relation between the gloss level for each device value relating to the concavo-convex ink and a device value relating to the gloss ink are used. As shown in FIG. 12, however, a LUT holding device values corresponding to a combination of a gloss level and a sparkle level may also be used.

In the above-described first embodiment, a concave and convex layer is formed to control a normal direction on a surface of a metallic ink layer, that is, orientation, but any method that can control orientation based on a sparkle level may be used.

In the above-described second embodiment, a prediction result of printing is notified to the user by displaying an output predicted value on the UI before printing, but a prediction result may be notified to the user in a different form. For example, a predicted print result may be displayed on the UI as an image, or a warning may be displayed in a case where a difference between an input value and an output predicted value exceeds a predetermined threshold.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. According to the present invention, glossiness and sense of sparkle can be reproduced on a printed material.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-050881, filed Mar. 13, 2015, which is hereby incorporated by reference wherein in its entirety.

What is claimed is:

1. An apparatus for generating image data for reproducing material appearance of an object to be rendered on a printed material, the apparatus comprising:
a gloss level obtaining unit configured to obtain a gloss level that evaluates glossiness of the object to be rendered;
a sparkle level obtaining unit configured to obtain a sparkle level that evaluates sense of sparkle of the object to be rendered, the sense of sparkle having a property that changes positions of a plurality of luminous points depending on a position of a light source and an observation angle; and
a deriving unit configured to derive a parameter relating to use of ink for reproduction of the material appearance by an image forming device, the image forming device receiving and printing the image data based on the obtained gloss level and sparkle level.

2. The apparatus according to claim 1, wherein the parameter specifies an amount of ink ejected by the image forming device, a halftone pattern to be used for ejection, and a number of ejections for the halftone pattern.

3. The apparatus according to claim 1, wherein the deriving unit derives the parameter by using a lookup table.

4. The apparatus according to claim 1, wherein the image forming device ejects two types of inks for reproducing glossiness and sense of sparkle on a printed material.

5. The apparatus according to claim 1, wherein an ink ejected to reproduce glossiness in the image forming device contains a sense of sparkle material and has a refractive index higher than that of a substrate.

6. The apparatus according to claim 1, wherein an ink ejected to reproduce sense of sparkle in the image forming device is an ultraviolet curable ink.

7. The apparatus of claim 1, wherein the position of the luminous point depends on a variation in normal angles caused by a concavo-convex surface of the object to be rendered or a particle orientation.

8. The apparatus according to claim 1, wherein the gloss level obtaining unit derives the gloss level based on one captured image obtained by imaging the object to be rendered.

9. The apparatus according to claim 8, wherein the gloss level obtaining unit converts an RGB value of each pixel forming the one captured image into a luminance value to derive the gloss level for each pixel and generates a gloss level image in which each pixel has a gloss level as a pixel value.

10. The apparatus according to claim 8, wherein the sparkle level obtaining unit derives the sparkle level based on a plurality of captured images obtained by imaging the object to be rendered under different geometry conditions.

11. The apparatus according to claim 10, wherein resolutions of the plurality of captured images are higher than a resolution of the one captured image.

12. The apparatus according to claim 10, wherein the sparkle level obtaining unit calculates a ratio of a number of luminous point pixels to a total number of pixels in an area rendering the object to be rendered with respect to each of the plurality of captured images, derives a normal distribution curve from a result of the calculation, and derives a dispersion from the derived normal distribution curve.

13. A method for generating image data for reproducing material appearance of an object to be rendered on a printed material, the method comprising:
obtaining a gloss level that evaluates glossiness of the object to be rendered;
obtaining a sparkle level that evaluates sense of sparkle of the object to be rendered, the sense of sparkle having a property that changes positions of a plurality of luminous points depending on a position of a light source and an observation angle; and
deriving a parameter relating to use of ink for reproduction of the material appearance by an image forming device, the image forming device receiving and printing the image data based on the obtained gloss level and sparkle level.

14. A non-transitory computer readable storage medium storing a program for causing a computer to perform a method for generating image data for reproducing material appearance of an object to be rendered on a printed material, the method comprising:
obtaining a gloss level that evaluates glossiness of the object to be rendered;
obtaining a sparkle level that evaluates sense of sparkle of the object to be rendered, the sense of sparkle having a property that changes positions of a plurality of luminous points depending on a position of a light source and an observation angle; and
deriving a parameter relating to use of ink for reproduction of the material appearance by an image forming device, the image forming device receiving and printing the image data based on the obtained gloss level and sparkle level.

* * * * *